United States Patent
Holste (10) Patent No.: US 11,927,681 B2
(45) Date of Patent: Mar. 12, 2024

(54) SYSTEM AND ASSOCIATED METHOD FOR MEASURING A CONSTRUCTION PIT

(71) Applicant: Hydromapper GmbH, Hamburg (DE)

(72) Inventor: Karsten Holste, Lauenbrück (DE)

(73) Assignee: Hydromapper GmbH, Hamburg (DE)

( * ) Notice: Subject to any disclaimer, the term of this patent is extended or adjusted under 35 U.S.C. 154(b) by 281 days.

(21) Appl. No.: 17/481,903

(22) Filed: Sep. 22, 2021

(65) Prior Publication Data
US 2022/0091279 A1 Mar. 24, 2022

(30) Foreign Application Priority Data
Sep. 23, 2020 (DE) ................. 10 2020 124 832

(51) Int. Cl.
*G01S 19/47* (2010.01)
*G01P 15/08* (2006.01)
*G01S 19/51* (2010.01)

(52) U.S. Cl.
CPC .......... *G01S 19/47* (2013.01); *G01P 15/0802* (2013.01); *G01S 19/51* (2013.01)

(58) Field of Classification Search
CPC ....... G01S 19/47; G01S 19/51; G01P 15/0802
USPC ............. 342/357.24, 357.3, 357.52, 352
See application file for complete search history.

(56) References Cited

U.S. PATENT DOCUMENTS

| 9,233,751 | B2* | 1/2016 | Metzler | G01S 19/51 |
| 10,240,924 | B2* | 3/2019 | Metzler | G01C 15/002 |
| 2013/0162469 | A1* | 6/2013 | Zogg | G01S 19/14 |
| | | | | 342/357.52 |
| 2014/0210663 | A1* | 7/2014 | Metzler | G01S 19/07 |
| | | | | 342/357.34 |

* cited by examiner

*Primary Examiner* — Bo Fan
(74) *Attorney, Agent, or Firm* — Barclay Damon LLP (57) ABSTRACT

A system for measuring a water-filled structure includes a measurement device. The measurement device comprises a sensor carrier with a first end arranged below water and a second end arranged above the water. At least one measurement sensor is positioned on the first end of the sensor carrier and is configured to measure the water-filled structure by capturing measurement data. An acceleration sensor is provided and a tachymeter is positioned outside of the water-filled structure. The position of the tachymeter is determined using GNSS measuring points configured to receive GNSS signals from satellites in a global navigation system. A control unit is configured to determine at least one of a current position of the measurement device and an orientation of the measurement device based on: (1) measuring data from the acceleration sensor; (2) the GNSS signals received by the GNSS measuring points; and (3) measuring data captured by the tachymeter.

20 Claims, 6 Drawing Sheets

SYSTEM AND ASSOCIATED METHOD FOR MEASURING A CONSTRUCTION PIT

CROSS REFERENCE TO RELATED APPLICATIONS

This application is based upon and claims priority to, under relevant sections of 35 U.S.C. § 119, German Patent Application No. 10 2020 124 832.6, filed Sep. 23, 2020, the entire contents of which are hereby incorporated by reference.

FIELD OF TECHNOLOGY

The invention relates to the measurement of a water-filled structure, in particular of a bottom and/or walls of the structure. The structure can be, for example, a pit or other depth-oriented structures, such as a shaft or a chamber. The measurement can comprise the measurement of the bottom and/or the walls of the structure. Such construction pits are excavated, for example, for the production of hydraulic structures. The construction pit can thus be, for example, a lock chamber for passing watercraft through a lock.

BACKGROUND

Measuring the bottom or the walls of a construction pit, for example, is necessary in particular for inspection purposes, meaning for the purpose of examining the ground or the walls for damage. As with the production of the construction pit, the measurement thereof must also take place underwater. The measurement of the bottom can already be performed, for example, during excavation to establish whether the pit has reached a desired depth. After excavation is complete, the bottom of a construction pit is often covered with concrete. During this process, it must be ensured that the concrete layer exactly reaches a specified thickness. This also must take place in a water-filled construction pit, since the concrete layer could burst when the water is pumped out of the pit if the concrete layer is faulty. Repairing damage resulting from this is in turn only possible in a water-filled construction pit, since otherwise further damage, in particular hydraulic heave, can occur.

Measurements of the bottom of a water-filled construction pit are usually done today through manual visual inspection by one or more divers. This, however, is very unreliable and not reproducible. In particular, difficulties arise when matching the measuring data collected by the diver to a specific position on the bottom of the construction pit. Underwater measurement using measuring rods that are mounted on floating buoys and measure the bottom of the construction pit by means of sensors arranged underwater is also known in principle. Such measuring rods are known, for example, from JP 2001 343 237 A and JP 2001 280 957 A. The position of such measuring rods can be determined relatively accurately, in particular using GPS, which improves the measurement. The positional accuracy, however, can be improved further.

BRIEF SUMMARY OF THE INVENTION

The object of the invention is to enable a measurement of a water-filled structure, in particular a water-filled construction pit, with higher positional accuracy.

An embodiment of the inventive system comprises a measurement device for measuring a water-filled structure, in particular a bottom of a water-filled construction pit, and a tachymeter. The measurement device comprises a rod-shaped sensor carrier with a first end arranged below the surface of the water in the use state of the measurement device, and a second end arranged above the surface of the water in the use state of the measurement device. At least one measurement sensor is arranged on the first end of the sensor carrier for measuring the structure, in particular the bottom of the construction pit, by capturing measurement data. The measurement device also comprises an acceleration sensor and a GNSS receiver for receiving GNSS signals from satellites in a global navigation satellite system, wherein the tachymeter is located on land and aimed at the measurement device. The system also comprises a control unit that is configured to ascertain a current position and/or orientation of the measurement device on the basis of measuring data from the acceleration sensor, on the basis of GNSS signals received by the GNSS receiver, and on the basis of measurement data captured by the tachymeter and to match it to the measuring data.

In an another embodiment, when GNSS reception is poor, the measuring device is alternatively or additionally equipped with a prism unit, preferably a 360° prism. The tachymeter is aimed at the prism unit to capture the position of the measuring device. In this embodiment, the tachymeter is positioned in the global coordinate system via GNSS measuring points. The tachymeter then measures, starting from its absolute position, the relative position of the prism unit so that the total measurement can be transformed into the global coordinate system.

An embodiment of a method for measuring a water-filled structure, in particular a bottom of a water-filled construction pit, comprises the steps of: bringing the measurement device into a use state in which the first end of the sensor carrier is arranged below the surface of the water, measuring the structure, in particular the bottom of the construction pit; using the at least one measurement sensor by capturing measurement data; ascertaining a current position and/or orientation of the measurement device on the basis of measuring data from the acceleration sensor, on the basis of the GNSS signals received by the GNSS receiver; and on the basis of the measuring data from a tachymeter located on land and aimed at the measurement device, matching the current position and/or orientation of the measurement device to the measurement data.

An alternative or additional embodiment of the method, which is used, for example but not only, when GNSS reception is poor for the measuring device, provides that the position of the tachymeter is established in the global coordinate system with the aid of GNSS measuring points. The tachymeter is then aimed at a prism unit, preferably a 360° prism, on the measuring device. It is thus possible to capture the measuring device in a global coordinate system.

The invention also relates to a measurement device for measuring a water-filled structure, in particular a bottom of a water-filled construction pit. The measurement device comprises a rod-shaped sensor carrier with a first end arranged below the surface of the water in the use state of the measurement device and a second end arranged above the surface of the water W in the use state of the measurement device. At least one measurement sensor is arranged on the first end of the sensor carrier for examining the structure, in particular the bottom of the construction pit, by capturing measurement data. The measurement device also comprises an acceleration sensor and a GNSS receiver for receiving GNSS signals from satellites in a global navigation satellite system, wherein the position and/or orientation of the measurement device can be ascertained and matched to the measurement data via a control unit on the basis of measuring data from the acceleration sensor, on the basis of the GNSS signals received by the GNSS receiver, and on the basis of measuring data captured by a tachymeter aimed at the measurement device.

In an alternative or additional embodiment of the measurement device, a prism unit is provided, the position of which is captured by the tachymeter. The placement of the tachymeter in the global coordinate system takes place via GNSS measuring points, which capture signals for their position determination from the GNSS satellites and thus allow the tachymeter to establish its position relative to the GNSS measuring points and thus transition to the global coordinate system.

In the event of shadows or the total absence of GNSS signals, the referencing, taking place over water, of the turning radius, its surface normal and the center of rotation, for example, are performed with an automatically targeting and measuring (tracking) tachymeter. Due to the high local measuring accuracy, this tachymeter can also be used to improve the quality and to bridge GNSS signal interruptions if the system is, for example, hung from cables and the GNSS reception is disrupted by the cables.

Since the measurements with acceleration sensors and inertial measurement units (IMUs) are ideally performed in a global, spatially fixed coordinate system (for example, WGS84) and not in a local position-based system (as is typical with a tachymeter with tachymeter position=0,0,0 and Z-axis coaxial to the local gravitational vector), what is known as stationing of the tachymeter in the WGS84 system takes place before the tachymeter measurement. For this purpose, at least 3, ideally 5-6, control points are determined one after the other by means of GNSS and tachymeter in a region measurable with GNSS, meaning, for example, outside of the hall or shadowed region. Using a 7-parameter transformation, the tachymeter is then transformed into the global coordinate system and can determine the position of the prism unit in the GNSS coordinate system as a result.

The prism unit can in principle be used simultaneously with GNSS, but also alone. It is possible to mount the prism unit on the side of the transverse carrier opposite the GNSS antenna or below the antenna. With two GNSS antennas, the prism can also of course be mounted below the transverse carrier, as a result of which the redundancy and error tolerance are improved.

An offset of the axis of rotation of the rod is calibrated as part of the evaluation, but can also—like with the GNSS antenna—be introduced as a target condition to increase the accuracy.

In the evaluation, X,Y,Z-coordinates are used so that the prism unit, rotating instead of or simultaneously with the GNSS antenna, can be used as a GNSS antenna. All measurements must be time-referenced very precisely due to the movement of the system. For this purpose, the tachymeter is synchronized with the GNSS time (UTC) or the atomic time standard via a measuring computer.

The prism unit can also of course be shadowed; in the case of mounting below the transverse carrier, this even occurs 2× per revolution due to the measuring rod. However, the tachymeter is able to find the position again even during the movement and continue the measurement after a short time.

The method according to the invention can be carried out by means of the system according to the invention. The system according to the invention is therefore suitable to carry out the method according to the invention. The measurement device according to the invention can be part of the system and used for the method. The system, method, and measurement device will be explained together in the following, wherein explanations made apply accordingly to all embodiments.

The structure, in particular a bottom and/or walls of the structure, can be measured using the at least one measurement sensor in the use state of the measurement device, meaning with the first end of the sensor carrier inserted into the water of the structure. In principle, the entire water contact surface of the structure can be measured. For this purpose, the rod-shaped sensor carrier can be held in the use state from land, as will be explained later. The rod-shaped sensor carrier can have, for example, a length of 50 m, preferably a length between 10 m and 25 m, in particular a length between 10 m and 22 m or between 15 m and 22 m. The at least one measurement sensor can therefore be brought to a depth of, for example, 22 m. Therefore, with a measurement 5 m above the bottom, for example, a construction pit with a depth of approx. 27 m can be measured. To measure the structure, the at least one measurement sensor can be rotated, as will be explained. During the measurement, knowledge of the current position of the measurement device and thus of the measurement sensor that is as exact as possible is of major importance, since only in this way can the measurement data gathered through the at least one measurement sensor be localized accurately. The same applies to the orientation of the measurement device or measurement sensor. With the invention, the measurement data can be matched to a position in particular with an accuracy of up to 5 cm. The control unit can ensure this in particular in real time.

According to the invention, a combination of a GNSS receiver, an acceleration sensor, and a tachymeter is provided for this purpose. The acceleration sensor can in particular be part of an inertial measurement unit. By means of the acceleration sensor, in particular by means of the inertial measurement unit, not only the position but also the spatial orientation of the measurement device can be determined. Such an inertial measurement unit is also referred to as an IMU. An IMU is known per se and has a spatial combination of multiple initial sensors, for example acceleration sensors and/or rotation rate sensors. In particular a movement of the measurement device can be detected by means of the acceleration sensor. The control unit takes this into account for ascertaining the current position or orientation of the measurement device. The GNSS signals are also involved in the position determination. As is known, GNSS is the abbreviation for global navigation satellite system, wherein this can be, for example, GPS, Galileo, GLONASS, BEIDOU or QZSS. The GNSS receiver can be arranged in particular at the second end of the sensor carrier, meaning above the surface of the water in the use state of the measurement device. In particular, two GNSS receivers can be provided for more accurate position determination. The combination of the measurement device and with it the at least one measurement sensor can already be determined relatively accurately by correlating the GNSS signals and the measuring data from the acceleration sensor or IMU. However, interruptions in the GNSS reception or limited data quality of the GNSS signals may occur. This negatively affects the accuracy of the position determination. In particular, a drift of the acceleration sensor or IMU can occur which can no longer be stabilized by the GNSS.

In an embodiment, in addition to the acceleration sensor or IMU and the GNSS receiver, a tachymeter is therefore provided for determining the position of the measurement device. In particular, the orientation of the measurement device can also be ascertained more exactly, for example a tilt of the sensor carrier, by means of the tachymeter. The tachymeter is arranged next to the construction pit on land and aimed at the measurement device, in particular at the second end of the sensor carrier arranged above the surface of the water. The tachymeter determines the position of the measurement device in space in a manner known per se. For example, the tachymeter can be aimed at a prism arranged on the measurement device or capture an optically clearly identifiable point on the measurement device with the aid of a camera arranged in the tachymeter. By combining the GNSS signals, the measuring data from the acceleration sensor or IMU, and the measuring data from the tachymeter, a particularly exact position determination and/or exact determination of the orientation of the measurement device can take place. By matching these position or orientation data to the measurement data gathered by the at least one measurement sensor, the measurement data can be localized exactly. This achieves a particularly exact measurement. For example, if the measuring device has poor GNSS signal reception, the position of the tachymeter can be determined with the aid of measuring points and the measuring device can be measured with the tachymeter using a prism unit.

The tachymeter can serve in particular to fill gaps in the position data or orientation data that arise due to a possible shadow of the GNSS signal. If the GNSS delivers insufficient data, the position can be determined based on the GNSS signals with lower-weighted accuracy for GNSS. If the GNSS signals are not received at all, the position can be determined only based on the measuring data from the acceleration sensor or IMU and the measuring data from the tachymeter. If, on the other hand, there is no visual contact with the tachymeter, the position can be determined at least based on the measuring data from the acceleration sensor or IMU and based on the GNSS signals.

According to one embodiment, a hanger is provided by means of which the measurement device can be brought into the use state. The measurement device can therefore be hung in the water-filled structure via a hanger such that the first end of the rod-shaped sensor carrier is located below the surface of the water and the second end of the rod-shaped sensor carrier opposite the first end is located above the surface of the water. The measurement device, in particular the rod-shaped sensor carrier, can be arranged, for example, on a measuring platform that is arranged above the construction pit by means of the hanger. There can be, for example, an operating person on the measuring platform. According to a related embodiment, the hanger can be a gimbaled hanger. The measurement device, in particular the sensor carrier, can thus be held in a particularly stable manner. In this way, the use of the measurement device is possible with high wind and waves even at great depths.

According to one embodiment, the system comprises a holding apparatus which is arranged next to the structure on land and is configured to hold the measurement device in the use state. In particular, the holding apparatus can comprise a boom that can be positioned over the surface of the water and enables the first end of the sensor carrier to be lowered into the water-filled structure. According to this embodiment, the measurement device is not arranged on a floating platform. Rather, the measurement device rests on land. The holding apparatus can be, for example, a platform located on land or a land-based vehicle such as a crane or a lifting device. Such a system is particularly practical for water-filled structures, in particular construction pits, that are accessible from land, since a floating platform such as, for example, a ship or boat can be dispensed with. The measurement device can thus be held in a particularly stable manner and is in particular less dependent on currents or movements on the surface of the water. The land-based vehicle can swing the boom out over the construction pit and thus bring the measurement device arranged on the hanger on the boom over the construction pit. Then, the measurement device, in particular the sensor carrier, can be lowered into the construction pit so that the first end of the sensor carrier is submerged through the surface of the water to a desired depth. With such a hanger, the measurement device, in particular the sensor carrier, can thus be made height-adjustable. The measurement device can thus be inserted to different distances into the construction pit depending on the depth of the construction pit by lowering it to corresponding distances.

To measure the structure, in particular its bottom, the at least one measurement sensor can rotate, as previously mentioned. According to one embodiment, this can be achieved in particular in that the sensor carrier is designed to be rotatable about its longitudinal axis. A corresponding rotation device can be provided, for example a rotary plate that is rotatable via a cable pull. A cable pull sensor can be arranged on the rotary plate to detect the rotational position or rotational movement. The measurement sensor can in particular measure in a plane, wherein a rotation of the measurement sensor by 360° can measure the area of a circle on the bottom.

According to one embodiment, the measurement device has additional sensors, in particular sensors for detecting a tilt and/or a rotation and/or a bend of the sensor carrier. A tilt or bend in the sensor carrier can lead to a position matched to the upper, second end of the measurement device not permitting a correct conclusion to be drawn about the position of the measurement sensor arranged on the lower, second end of the sensor carrier. This can lead to an offset between the first and the second end of the sensor carrier, for example by 10 cm, due to the bend. According to one embodiment, it is provided that a tilt, rotation, and/or bend relative to the longitudinal axis of the sensor carrier is taken into account when matching the position and/or orientation to the measurement data. Such an error can thus be compensated for. For example, strain gauges can be provided to ascertain the bend of the sensor carrier. These can ascertain, for example, a current-induced bend of the sensor carrier caused by a current present in the water. Taking into account the bend of the sensor carrier during the evaluation is in particular important when the measurement is performed while the measurement sensor is rotating. In this case, the measuring plane of the measurement sensor passes over each point on the bottom twice, namely a first time with a rotation of 180° and a second time with a further rotation of 180°. In this case, an even greater error in the localization of the measurement data can occur due to a bend in the sensor carrier. With the mentioned offset of 10 cm, a localization that is inaccurate by 20 cm can occur due to the rotation. This error can be compensated for by calibrating the measurement device. The bend could thus be ascertained, for example by measuring the sensor carrier on land, and be taken into account for the following evaluation, meaning in particular the matching of the ascertained position and/or orientation to the measurement data.

According to one embodiment, the control unit is also configured to temporally synchronize the measuring data from the acceleration sensor, in particular the inertial measurement unit, the measuring data from the tachymeter, and the GNSS signals with each other using the GNSS receiver. The method can accordingly provide a temporal synchronization. Such a temporal synchronization is useful at least when the GNSS receiver receives insufficient GNSS signals. Such a synchronization can take place in particular via a clock of the GNSS receiver. The GNSS signals received by the GNSS receiver can also comprise a time signal, wherein the temporal synchronization can take place using the time signal. A temporal synchronization enables the position of the measurement device to be ascertained in real time and thereby accelerates the data evaluation.

According to one embodiment, the control unit is configured to correct a drift of the acceleration sensor, in particular of the inertia measurement unit, by means of the GNSS signals and the measuring data from the tachymeter. The drift arising with such IMUs, meaning an undesired deviation of the sensors of the IMU, can thus be corrected using the GNSS signals. In particular, such a correction also takes place according to this embodiment via the tachymeter, which allows a particularly reliable correction, and also enables such when no GNSS signal is available.

According to an embodiment, an orientation of the measurement device can also be assigned to the measurement data, as explained. According to one embodiment, the tachymeter can be configured to ascertain the orientation of the measurement device. In particular, the tachymeter can have a camera with which the current orientation of the measurement device can be ascertained. The orientation of the measurement device, in particular a tilt of the sensor carrier, is also relevant to the measurement data.

According to one embodiment, the at least one measurement sensor is chosen from the following: camera, in particular a thermal camera or a multispectral camera, laser scanner, echo sounder, in particular a multibeam echo sounder, 3D, surface, or line sensor. The multibeam echo sounder is also called a multibeam. If multiple measurement sensors are provided, they can comprise any combination of the sensors listed.

BRIEF DESCRIPTION OF THE DRAWINGS

An embodiment of the invention is explained below using figures. In the figures.

If not otherwise specified, the same reference numbers indicate the same objects below.

DETAILED DESCRIPTION OF THE INVENTION

Figure 1:
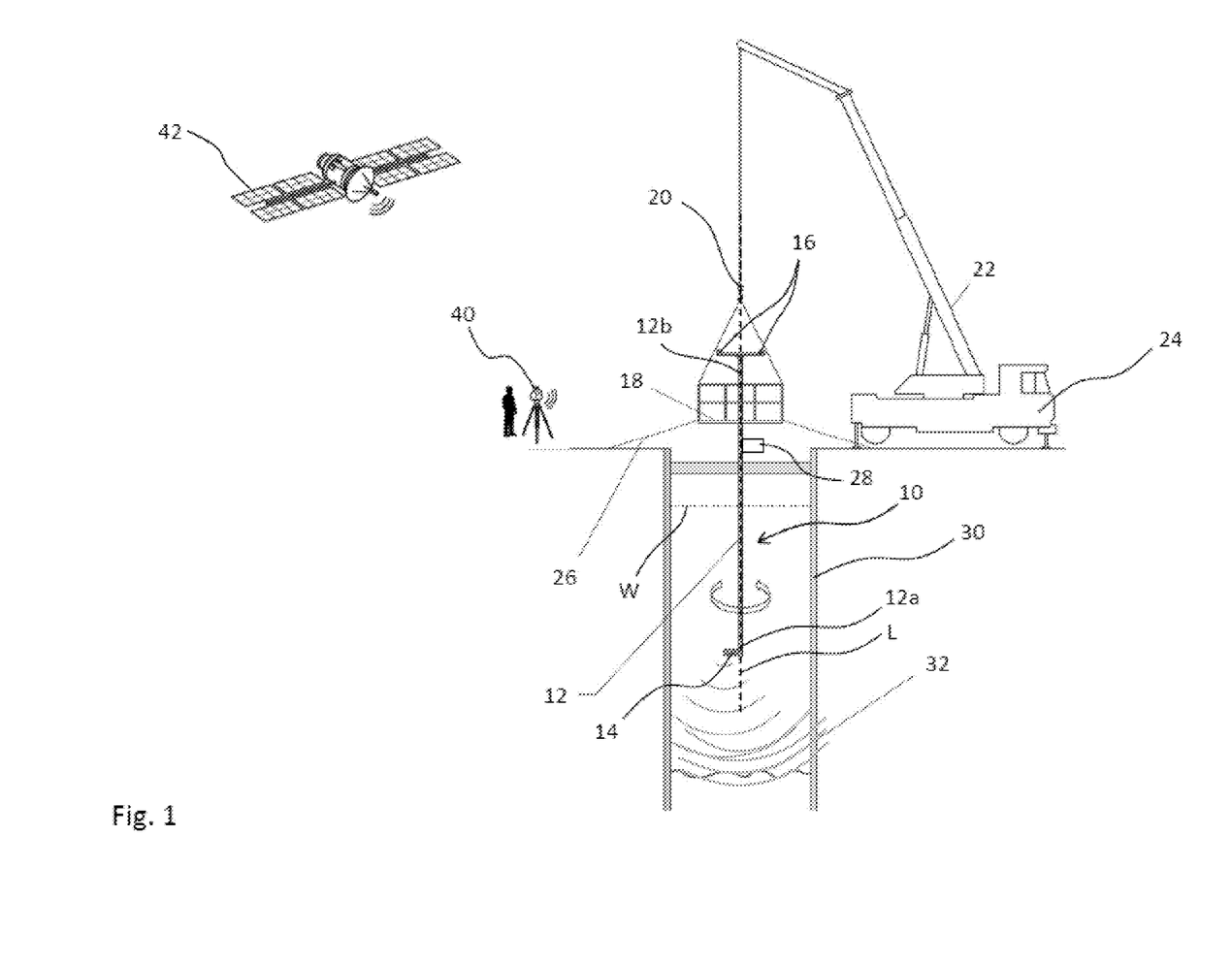
FIG. 1 illustrates a side view of an embodiment of a system for measuring a construction pit comprising a measurement device inserted into a construction pit by means of a crane, and a tachymeter.

FIG. 1 shows a system according to the invention comprising a measurement device 10 and a tachymeter 40. The measurement device 10 comprises a rod-shaped sensor carrier 12 with a first end 12a and a second end 12b opposite the first end. A measurement sensor 14 configured as a multibeam is arranged on the first end 12a, while a heading with two GNSS receivers 16 is arranged on the second end 12b. Depending on the embodiment selected, the GNSS receiver 16 can also additionally or exclusively have a prism unit which is configured, for example, as a 360° prism and measured by the tachymeter. The measurement device 10 also comprises an inertial measurement unit 28, referred to in the following as an IMU. The IMU 28 comprises at least one acceleration sensor and can comprise additional sensors, in particular rotation rate sensors. The object of the system is planar 3D capture of vertical or slanted structures, shafts, and constructions and of slanted or horizontal tunnels that lie underwater and cannot be reached or can only be reached with great difficulty from the surface. The entrances to these structures can be located in open air or in buildings/halls/tunnels or in environments with poor GNSS reception (forest, under bridges, in deep urban canyons). For this purpose, a planar 2D measurement sensor and/or a thermal sensor is moved in a rotating or oscillating manner on a long sensor rod. Depending on the sensor, this boom can be arranged stably above the object or moving/swinging on a hook or cable. The sensor rod is not limited in its length (e.g., 50 m long).

The measurement device 10 is mounted rotatably on a measuring platform 18 so that the sensor carrier 12 can be rotated about its longitudinal axis L. The measuring platform 18 has an opening 19 through which the sensor carrier 12 protrudes, as can be seen in particular in FIG. 2. The measuring platform 18 and with it the measurement device 10 are arranged on a hanger 20 of a boom 22 of a crane vehicle 24. The measurement device 10 can be swung out over a construction pit 30 using the boom 22 and lowered into the construction pit 30. In this use state of the measurement device 10 visible in the figures, the first end 12a of the sensor carrier 12 is located below the surface of the water W so that a bottom 32 of the construction pit 30 can be examined with the measurement sensor 14. The second end 12b is located above the surface of the water W, in particular also above the construction pit 30, as is also visible in the figures. To secure the measuring platform 18, it is fixed to the ground surrounding the construction pit 30 using guy lines 26. The construction pit can have a stabilizing brace 34 which can extend between opposite walls of the construction pit 30, as can be seen in FIG. 2.

Measuring data from the IMU 28 and from the tachymeter 40 aimed at the measurement device 10 are evaluated by means of a control unit (not shown) of the system and GNSS signals received by a satellite 42 are evaluated by means of the GNSS receivers 16 to ascertain a current position and orientation of the measurement device 10. The position or orientation captured in this way are matched by means of the control unit to the measurement data emitted by the measurement sensor 14. These measurement data contain information about the measured bottom 32 of the construction pit 30 and are captured as the measurement sensor 14 rotates about the longitudinal axis L of the sensor carrier 12. A localization of these measurement data that is as exact as possible is necessary for a meaningful measurement of the bottom 32 of the construction pit 30. According to the invention, this is achieved by the mentioned combination of the GNSS signals, the measuring data from the IMU, and the measuring data from the tachymeter.

Figure 2:
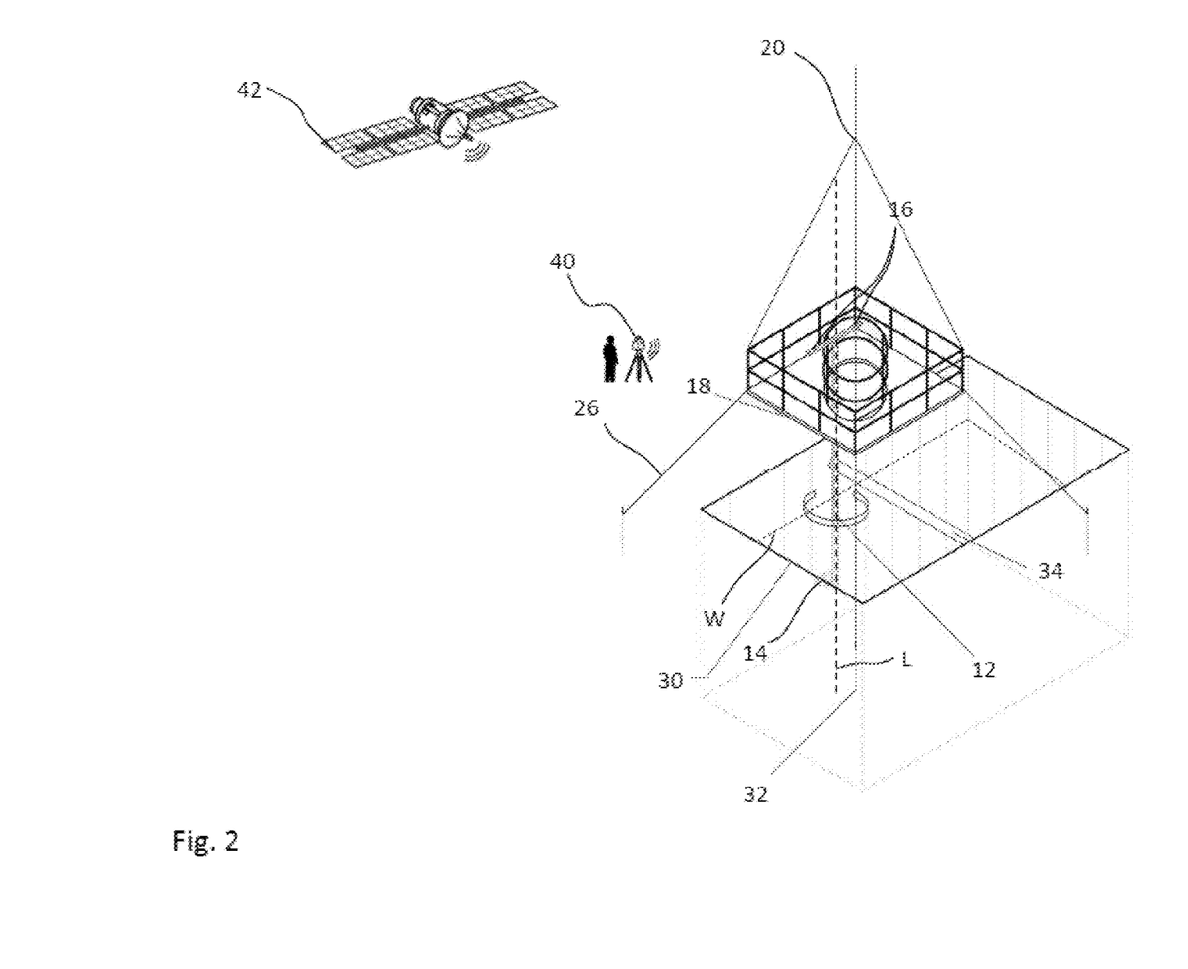
FIG. 2 illustrates a top perspective view of the embodiment of the measurement device and construction pit from FIG. 1.
Figure 3:
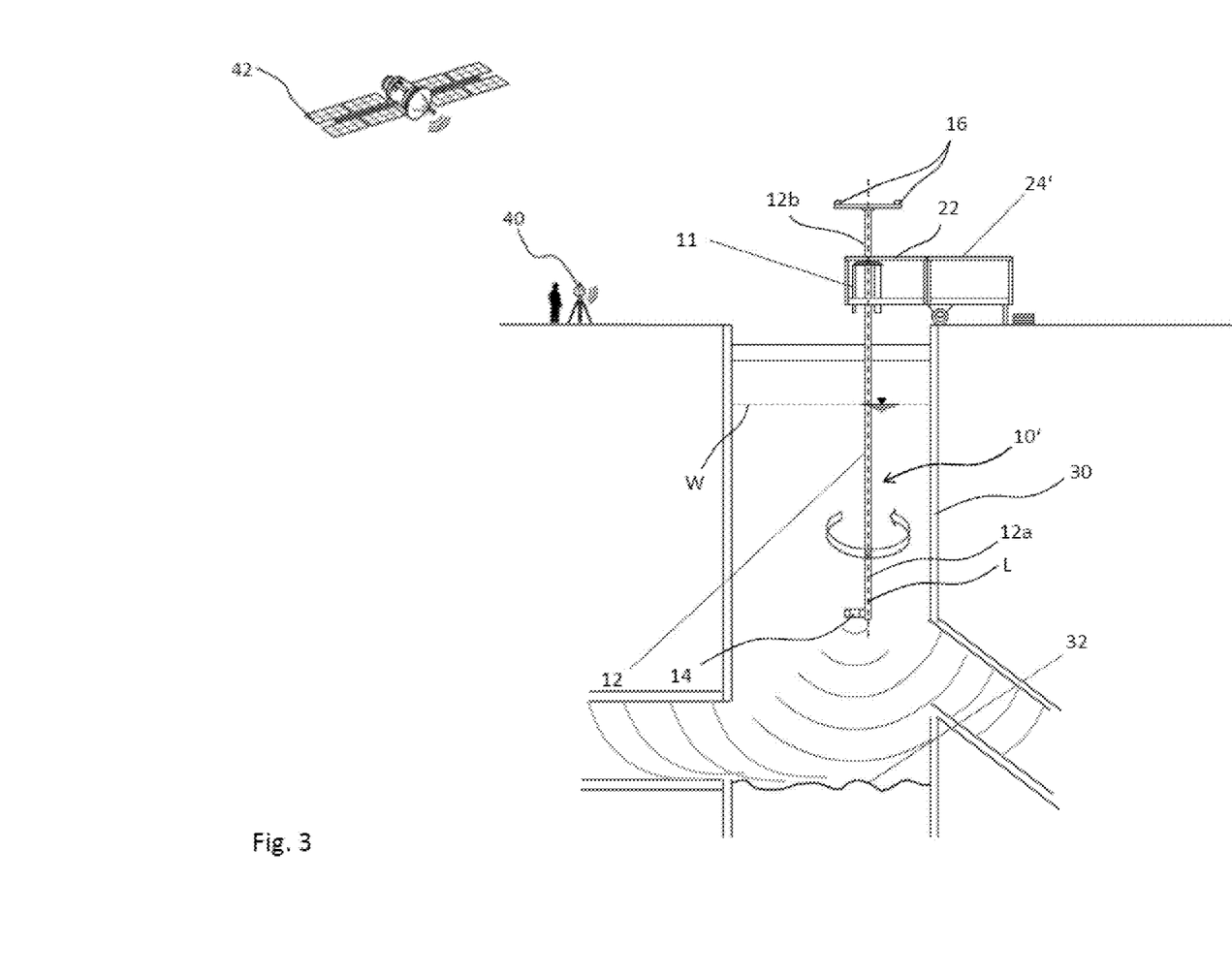
FIG. 3 illustrates a side view of an embodiment of a measurement device inserted into a construction pit by means of a platform sitting on the edge of the pit.
Figure 4A:
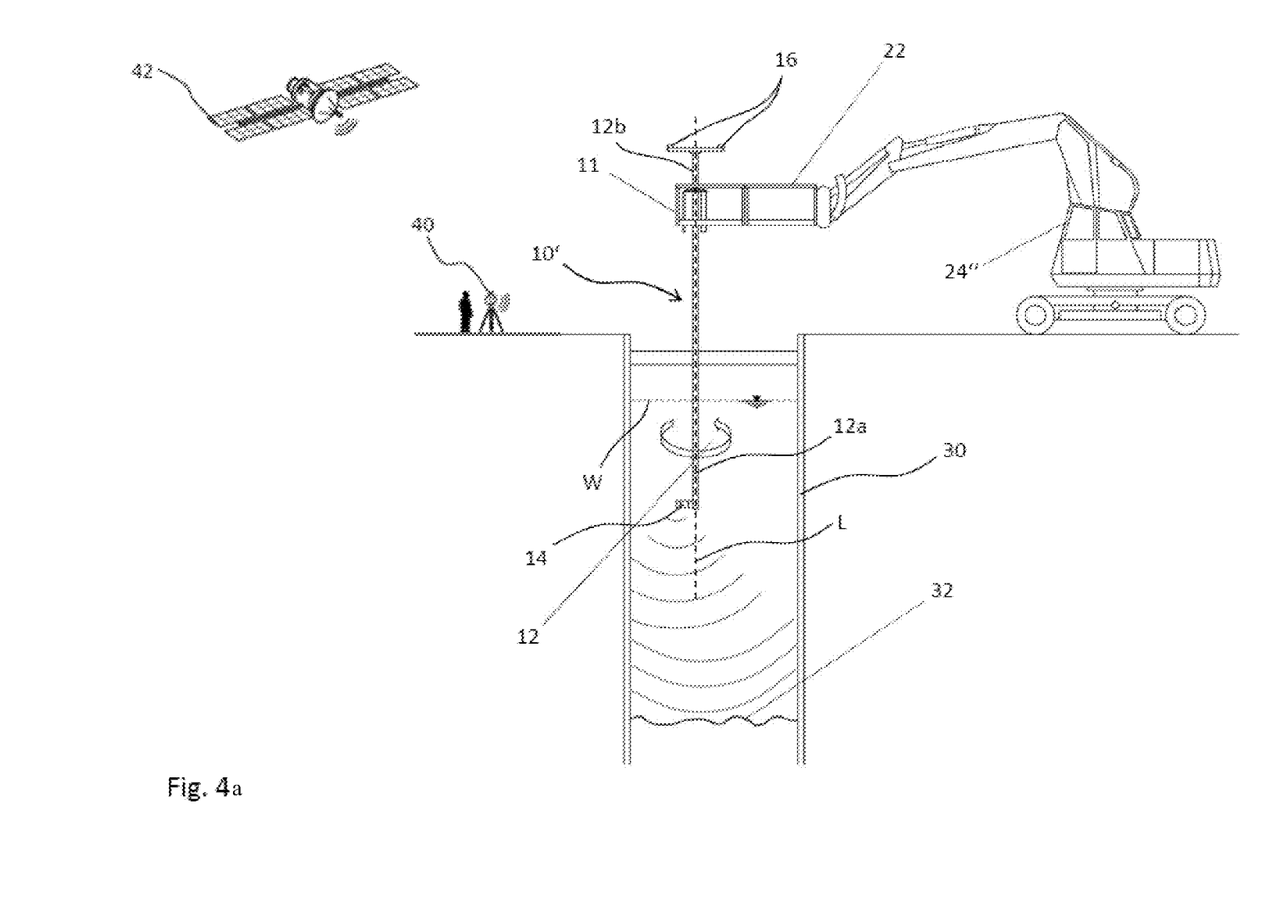
FIG. 4A illustrates a side view of an embodiment of a measurement device inserted into a construction pit by means of a lifting device.
Figure 4B:
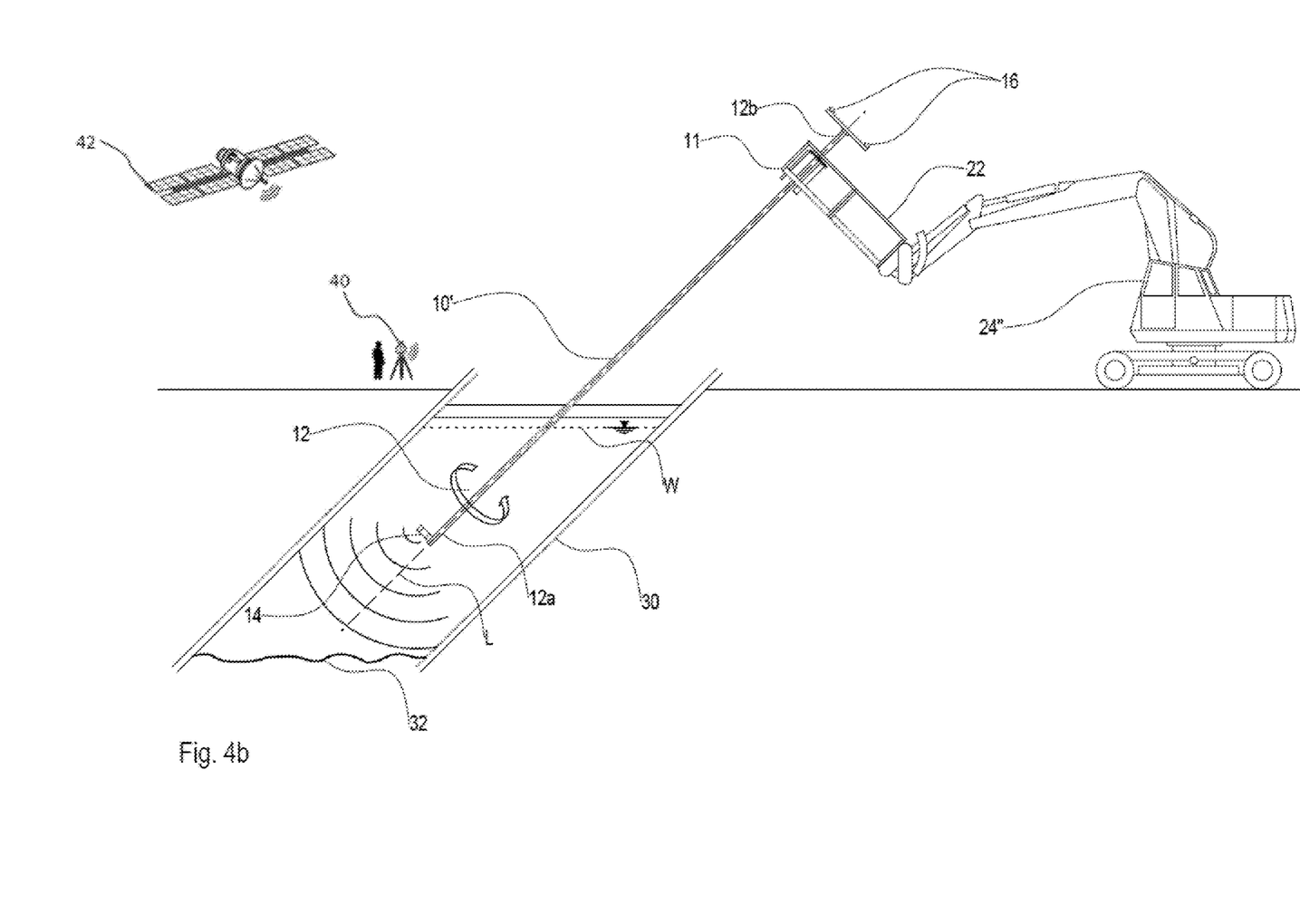
FIG. 4B illustrates a side view of an embodiment of a measurement device inserted into a slanted construction pit by means of a lifting device.

Instead of using a crane vehicle, the measurement device can also be brought into the use state, for example, via a platform 24' located on land or a lifting device 24" located on land, as can be seen in FIGS. 3 and 4, respectively. In FIG. 3, a part of the platform 24' to be understood as a boom 22 projects over the construction pit 30, wherein the sensor carrier 12 of the measurement device 10' projects vertically downward into the water through an opening in the bottom of the boom 22. In FIG. 4, a correspondingly designed boom 22 is held over the construction pit 30 by means of an arm of the lifting vehicle 24" and carries a measurement device 10". By moving the arm of the lifting vehicle 24", the height of the measurement device 10" can be easily adjusted and the measurement sensor 14 can be brought to the desired depth in the construction pit. The measurement device 10 from FIGS. 1 and 2 could also be brought into the use position and held there by means of the platform 24' or the lifting vehicle 24". Correspondingly, the measurement devices 10', 10" could also be positioned via a hanger and crane vehicle as in FIG. 1.

Figure 5:
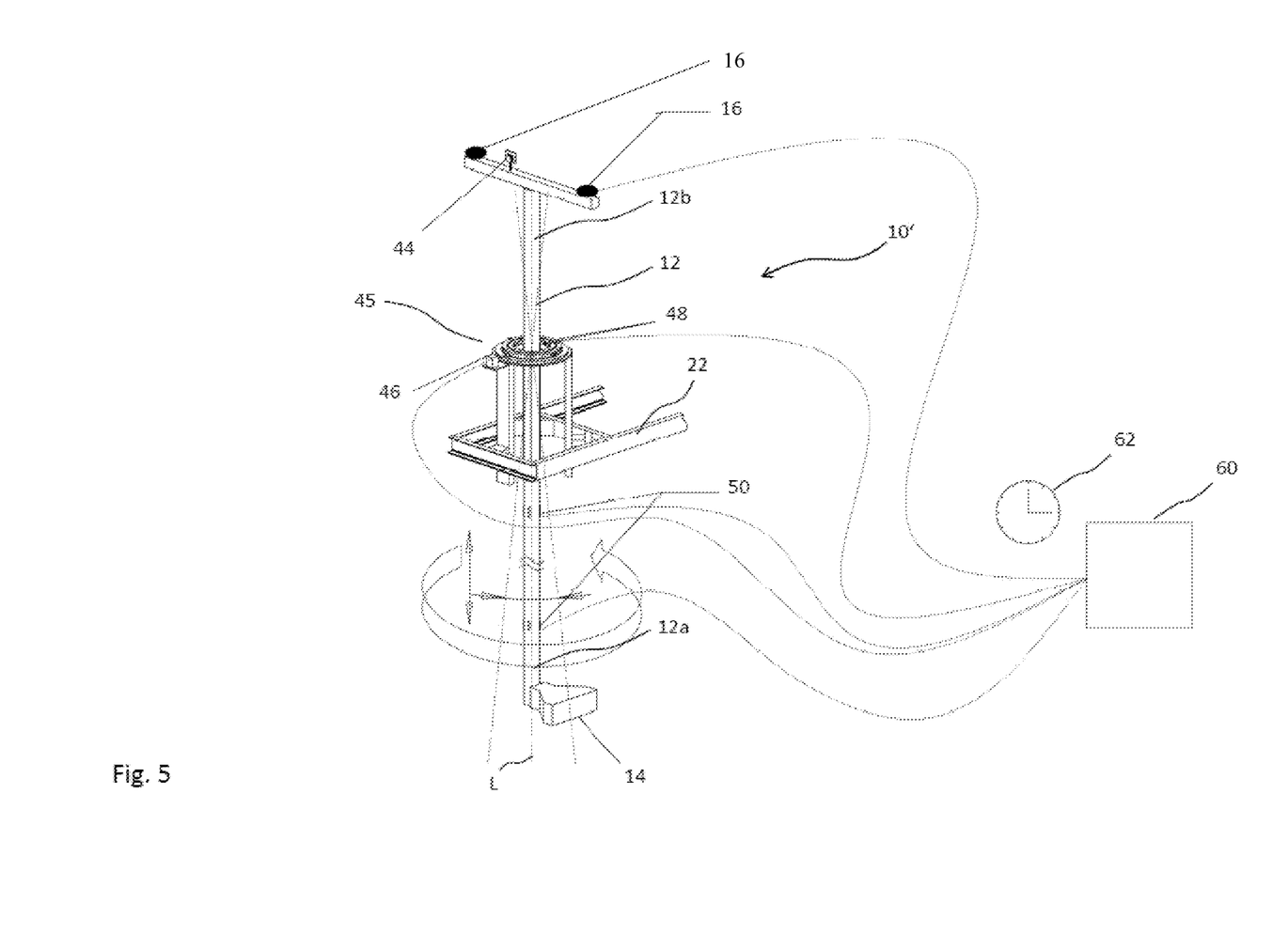
FIG. 5 illustrates a perspective view of another embodiment of the measurement device.

The measurement devices 10', 10" differ from the measurement device 10 from FIGS. 1 and 2 by a seat unit 45 (FIG. 5) for accommodating additional sensors, including a rotation sensor 46 and a tilt sensor 48, and by strain gauges 50 arranged on the sensor carrier 12, as can be seen in FIG. 5. This figure shows a prism 44 at which the tachymeter is aimed. The measurement devices 10 can also have such a prism. The tilt sensor 48 enables a tilt of the sensor carrier 12, meaning a tipping of its longitudinal axis L relative to vertical, to be ascertained. The rotation sensor 46 ascertains a rotational position or a rotational movement of the sensor carrier 12 about the longitudinal axis. The strain gauges 50 can ascertain a bend of the sensor carrier in relation to the longitudinal axis L. A tilt, rotation, and/or bend ascertained by these sensors can be taken into account for the matching of the position and/or the orientation to the measurement data.

A tilt or bend in the sensor carrier 12 can lead to a position matched to the upper, second end 12b of the sensor carrier not permitting a correct conclusion to be drawn about the position of the measurement sensor 14 arranged on the lower, second end 12a of the sensor carrier 12. This can lead to an offset between the first end 12a and the second end 12b of the sensor carrier, for example by 10 cm, due to the bend. Such an error can be compensated for by taking into account the tilt or bend. Taking into account the bend of the sensor carrier during the evaluation is in particular important when the measurement is performed while the measurement sensor is rotating. In this case, the measuring plane of the measurement sensor passes over each point on the bottom twice, namely a first time with a rotation of 180° and a second time with a further rotation of 180°. In this case, an even greater error in the localization of the measurement data can occur due to a bend in the sensor carrier. With the mentioned offset of 10 cm, a localization that is inaccurate by 20 cm can occur due to the rotation. A compensation of this error is particularly important.

FIG. 5 also shows a central computer 60 which communicates with the sensors of the measurement device 10'. This central computer 60 can serve as a central control unit that performs the localization of the measurement data and in particular also a temporal synchronization, shown symbolically at reference sign 62. The measurement device 10 can also of course communicate accordingly with a central computer. The seat unit 45 furthermore also serves as a hanger of the measurement device on the boom 22, as can be seen in FIG. 5.

If the measuring system cannot be immovably fixed (such as on a crane), an inertial measurement unit (IMU) is used to determine the time-referenced deviation dX, dY, dZ as well as the angle of rotation about the axes X, Y, and Z from the initial axis of rotation of the sensor rod and also, in conjunction with GNSS, the coordinates of the gimbaled joint over water. If the device is placed in flowing bodies of water or the rod is so long that it statically bends, meaning it is no longer linear, then the bend of the rod can be determined by multiple strain gauges along the rod and taken into account computationally. For higher accuracy, the angle of rotation about Z can also be determined by means of a cable pull sensor which is attached to the top of the gimbaled holder of the rod and the rotation of the rod is determined by the unwinding of the cable of the sensor with a known unrolling radius. Alternatively to the cable pull sensor, a rotary encoder/angle encoder or lateral distance encoder can also be attached to the turning radius. As a result, the object coordinates determined by the measurement sensor become significantly more accurate, since a lateral error from incorrect/inaccurate angles of rotation has a greater impact at larger measuring distances (due to beam offset) than a position error of the rod. In the case of unstable and long rods, the acceleration sensor can also be replaced by an inertial measurement unit at the bottom of the rod. In the case of unstable rods that do not have a constant axis of rotation, a second IMU above the water in the vicinity of the GNSS antenna can also be used in addition to the IMU underwater, to be able to measure and compensate for the unknown bending/buckling of the rod and the unknown variation of the axis of rotation.

LIST OF REFERENCE SIGNS

10 Measurement device
12 Sensor carrier
11 Sensor seat
12a First end
12b Second end
14 Measurement sensor
16 Two GNSS receivers
16' GNSS measuring points
18 Measuring platform
19 Opening
20 Hanger
22 Boom
24 Crane vehicle
24' Platform on land
24" Lifting device
26 Guy lines
28 Inertial measurement unit (IMU)
30 Construction pit
32 Bottom
34 Brace
40 Tachymeter
42 Satellite
44 Prism
45 Seat unit
46 Rotation sensor
48 Tilt sensor
50 Strain gauge
60 Central computer
62 Temporal synchronization
W Surface of the water
L Longitudinal axis

The invention claimed is:

1. A system for measuring a water-filled structure, the system comprising:
   a measurement device comprising,
   a sensor carrier with a first end arranged below a surface of water when the measurement device is in a state of use,
   a second end arranged above the surface of water when the measurement device is in the state of use,
   at least one measurement sensor arranged on the first end of the sensor carrier and configured to measure the water-filled structure by capturing measurement data, and
   an acceleration sensor and a GNSS receiver configured to receive GNSS signals from satellites in a global navigation satellite system;
   a tachymeter positioned outside of the water-filled structure and configured to be aimed at the measurement device; and
   a control unit configured to determine at least one of: (1) a current position of the measurement device; and (2) an orientation of the measuring device, using measuring data from the acceleration sensor, the GNSS signals received by the GNSS receiver, and the measuring data captured by the tachymeter,
   wherein the control unit is further configured to match the at least one of the current position and the orientation, to the measurement data.

2. A system for measuring a water-filled structure, the system comprising:
   a measurement device comprising,
   a sensor carrier with a first end arranged below a surface of water when the measurement device is in a state of use, and
   a second end arranged above the surface of the water when the measurement device is in the state of use,
   at least one measurement sensor positioned on the first end of the sensor carrier and configured to measure the water-filled structure by capturing measurement data, and
   an acceleration sensor and a prism unit;
   a tachymeter positioned outside of the water-filled structure and configured to be aimed at the measuring device, wherein a position of the tachymeter is determined using GNSS measuring points configured to receive GNSS signals from satellites in a global navigation system; and
   a control unit configured to determine at least one of (1) a current position of the measurement device and (2) an orientation of the measurement device, based on: (1) measuring data from the acceleration sensor; (2) the GNSS signals received by the GNSS measuring points; and (3) measuring data captured by the tachymeter, and further configured to match the at least one of the current position and orientation to the measurement data.

3. The system according to claim 1, further comprising a hanger configured to bring the measurement device into the state of use.

4. The system according to claim 3, wherein the hanger is a gimbaled hanger.

5. The system according to claim 2, further comprising a holding apparatus positioned next to the water-filled structure and configured to hold the measurement device when in the state of use.

6. The system according to claim 5, wherein the holding apparatus comprises a boom configured to be positioned over the surface of the water and wherein the boom is further configured to enable the first end of the sensor carrier to be lowered into the water-filled structure.

7. The system according to claim 2, wherein the sensor carrier is configured to be rotated about its longitudinal axis.

8. The system according to claim 2, wherein the control unit is configured to temporally synchronize the measuring data from the acceleration sensor, the measuring data from the tachymeter, and the GNSS signals with each other using the GNSS receiver.

9. The system according to claim 8, wherein the control unit is configured to at least one of; (1) use a time signal received by the GNSS receiver of the tachymeter; and (2) to provide the measuring data received by the tachymeter with a time stamp upon reception.

10. The system according to claim 2, wherein the acceleration sensor is part of an inertial measurement unit.

11. The system according to claim 10, wherein the control unit is configured to correct a drift of the inertial measurement unit using the GNSS signals and the measuring data from the tachymeter.

12. The system according to claim 2, wherein the at least one measurement sensor is at least one of a camera, a laser scanner, an echo sounder, such as a multibeam echo sounder, a 3D surface sensor, and a line sensor.

13. A method for measuring a water-filled structure using a measurement device, the method comprising:
   structuring the measurement device to comprise a sensor carrier comprising a first end and a second end, wherein the sensor carrier is configured to carry at least one measurement sensor;
   positioning the first end of the sensor carrier of the measurement device below a surface of water;
   measuring the water-filled structure with the at least one measurement sensor by capturing measurement data;
   determining at least one of (1) a current position of the measurement device, and (2) an orientation of the measurement device from measuring data from an acceleration sensor, wherein the measuring data comprises at least one of: (1) GNSS signals received by a GNSS receiver; and (2) measuring data from a tachymeter located on land and aimed at the measurement device; and matching the at least one of the current position and the orientation of the measurement device to the measurement data.

14. A method for measuring a water-filled structure, the method comprising:
   structuring a measurement device to comprise a sensor carrier including a first end;
   positioning the first end of the sensor carrier below a water surface;
   measuring the water-filled structure with at least one measurement sensor by capturing measurement data,
   determining at least one of a current position and an orientation of the measurement device using measuring data from an acceleration sensor based on: (1) GNSS signals received by GNSS measuring points for a position of a tachymeter; and (2) measuring data from the tachymeter aimed at prism apparatuses; and
   matching the at least one of the current position and the orientation of the measurement device to the measurement data.

15. The method according to claim 13, wherein when the GNSS receiver receives insufficient GNSS signals, temporal synchronization of the measuring data from the acceleration sensor, the measuring data from the tachymeter, and the GNSS signals with each other is performed using the GNSS receiver.

16. The method according to claim 13, wherein bringing the measurement device into a state of use is done with a holding apparatus positioned next to the water-filled structure.

17. The method according to claim 16, wherein the measuring device is positioned over the water-filled structure, and wherein the first end of the sensor carrier is lowered into the water-filled structure.

18. The method according to claim 17, wherein matching the current position to the measurement data takes into account at least one of: (1) a tilt; (2) a rotation; and (3) a bend of the sensor carrier.

19. A measurement device for measuring a water-filled structure, the measurement device comprising:
   a sensor carrier comprising a first end positioned below a water surface when in a state of use, and a second end positioned above the water surface when in the state of use;
   at least one measurement sensor positioned on the first end of the sensor carrier and configured to examine the water-filled structure by capturing measurement data;
   an acceleration sensor and a GNSS receiver configured to receive GNSS signals from satellites in a global navigation satellite system, wherein a position of the measurement device is determined using a control unit according to: (1) measuring data from the acceleration sensor, (2) the GNSS signals received by the GNSS receiver; and (3) the measuring data captured by a tachymeter aimed at the measurement device and wherein the position of the measurement device is matched to the measurement data.

20. A measurement device for measuring a water-filled structure, the measurement device comprising:
   a sensor carrier comprising a first end and a second end, wherein when in a state of use, the first end is positioned below water and the second end positioned above the water;
   at least one measurement sensor positioned on the first end of the sensor carrier and configured to examine the structure by capturing measurement data; and
   an acceleration sensor; and
   GNSS measuring points configured to receive GNSS signals from satellites in a global navigation satellite system and determine a position of a tachymeter, wherein at least one of (1) a position of the measurement device, and (2) an orientation of the measurement device is determined based on the measuring data from the acceleration sensor, the GNSS signals received by the GNSS measuring points, and the measuring data captured by the tachymeter aimed at the measurement device, and wherein the position of the measurement device is matched to the measurement data.

* * * * *